*US006212983B1*

(12) United States Patent
Pyle (10) Patent No.: US 6,212,983 B1
(45) Date of Patent: Apr. 10, 2001

(54) TILTABLE INFEED AND OUTFEED SAW TABLE

(76) Inventor: Stoddard H. Pyle, 3955 SW. Brooklane Dr., Corvallis, OR (US) 97333

( * ) Notice: Subject to any disclaimer, the term of this patent is extended or adjusted under 35 U.S.C. 154(b) by 0 days.

(21) Appl. No.: 08/620,376

(22) Filed: Mar. 22, 1996

Related U.S. Application Data (63) Continuation-in-part of application No. 08/140,298, filed on Oct. 20, 1993, now abandoned, which is a continuation of application No. 07/845,967, filed on Mar. 4, 1992, now abandoned.

(51) Int. Cl.$^7$ .............................. B27B 5/20; B23D 47/04
(52) U.S. Cl. .................. 83/34; 83/36; 83/72; 83/157; 83/276; 83/438; 83/453; 83/471.3; 83/473; 83/477; 83/477.1; 83/486.1; 83/581; 144/363; 144/377; 144/379
(58) Field of Search .................. 83/34, 35, 36, 83/76.1, 471.2, 471.3, 472, 473, 471, 477, 581, 781, 809, 810, 72, 157, 276, 438, 452, 453; 144/377, 378, 363, 379

(56) References Cited

U.S. PATENT DOCUMENTS

| 942,557 | 12/1909 | Hartwell | 83/400 |
|---|---|---|---|
| 1,910,651 | 5/1933 | Tautz | 83/477 |
| 2,453,899 | 11/1948 | Gaines | 83/747 |
| 2,599,893 | * 6/1952 | Butler | 83/471.3 X |
| 2,663,331 | 12/1953 | Herder | 83/781 X |
| 3,289,662 | * 12/1966 | Garrison | 83/471.3 X |
| 3,302,669 | * 2/1967 | Edler | 83/471.3 |
| 3,568,739 | 3/1971 | Kirk | 83/471.2 |
| 4,031,933 | 6/1977 | Piche | 144/198 R |
| 4,452,117 | * 6/1984 | Brickner et al. | 83/581 X |
| 4,454,794 | 6/1984 | Thornton | 83/471.3 |
| 4,545,274 | 10/1985 | Germond | 83/486.1 |
| 5,176,060 | 1/1993 | Thornton | 83/471.2 |

FOREIGN PATENT DOCUMENTS 0 032 383   1/1980  (EP) .

* cited by examiner

Primary Examiner—Clark F. Dexter
(74) Attorney, Agent, or Firm—Klarquist Sparkman Campbell Leigh & Whinston, LLP

(57) ABSTRACT

An apparatus for sequentially and automatically cutting a piece of dimension lumber at a number of predetermined angles to produce a building component, such as a rafter or truss web or chord, with composite or compound angles, is disclosed. The apparatus includes infeed and outfeed tables tiltable about a longitudinal axis and equipped with fences along which a workpiece moves longitudinally via moving devices. Clamps hold the workpiece at different positions relative to a cutting station during a cutting operation. A cutter, which for example includes a circular saw blade, is mounted for a positioning movement about a vertical axis at the cutting station, as well as for vertical movement to cut a workpiece at a predetermined composite or compound angle. The entire lumber cutting process at both ends of the workpiece, including lumber movement on the table past the cutting station, angular cutter and table adjustment, cutter movement, and clamping and unclamping, is under the control of a programmable computer operating in conjunction with appropriate sensors and pulse counters on the equipment.

27 Claims, 6 Drawing Sheets

TILTABLE INFEED AND OUTFEED SAW TABLE

RELATED APPLICATIONS

This application is a continuation-in-part of application Ser. No. 08/140,298 filed Oct. 20, 1993, now abandoned, which is a continuation of application Ser. No. 07/845,967 filed Mar. 4, 1992, now abandoned.

FIELD OF THE INVENTION

This invention relates, in general, to an apparatus for the physical preparation of semi-finished material into finished components; e.g., dimension lumber into finished rafters having predetermined lengths and angles at the ends thereof, for use in building construction.

In particular, this invention relates to an apparatus, including a novel tiltable table and adjustable cutting device, for processing workpieces of semi-finished material into finished components for assembly, and to a computer control and program for controlling same.

DOCUMENT DISCLOSURE DEPOSIT

This invention is described and disclosed in a document and drawings prepared and filed by Applicant herein, in the Document Disclosure Program of the U.S. Patent and Trademark Office, Ser. No. 284,271, filed Jun. 14, 1991.

BACKGROUND OF THE INVENTION

Most lumber used in the construction industry is known as dimension lumber, which the present invention is intended to use. Dimension lumber has opposite sides parallel, with adjacent sides forming a right angle, and is generally known by the nominal dimensions of the sides, e.g., 2×4, 2×6, 4×8, etc. The longer sides hereinafter are called "faces," and the shorter sides are called "edges." The pieces of dimension lumber to be processed by the present invention are called "workpieces" herein and, after cutting or processing, are called "components," e.g., rafters of several kinds, and webs and chords for trusses.

There are three kinds of rafters with which the present invention is primarily concerned:

1. "regular" rafters:
   those which intersect their support or supported members, i.e., plates or ridge beams, respectively, at right angles to the faces, but at an angle to the edges thereof;
2. "jack" rafters:
   those which, at one end, intersect at least one of their support or supported members at something other than a right angle to each of the faces and edges of the rafter, requiring a cut at what is called hereinafter a "composite" angle on that end of the rafter; and
3. "hip" and "valley" rafters:
   those which intersect their support or supported members where two or more come together at an angle, requiring two cuts, called hereinafter "compound" cuts, on that end of the rafter, one or both of which may be composite angles. The angle at which the support or supported members come together is often, but not always, a right angle.

Figures 1A, 1B, 1C, 2, 3:
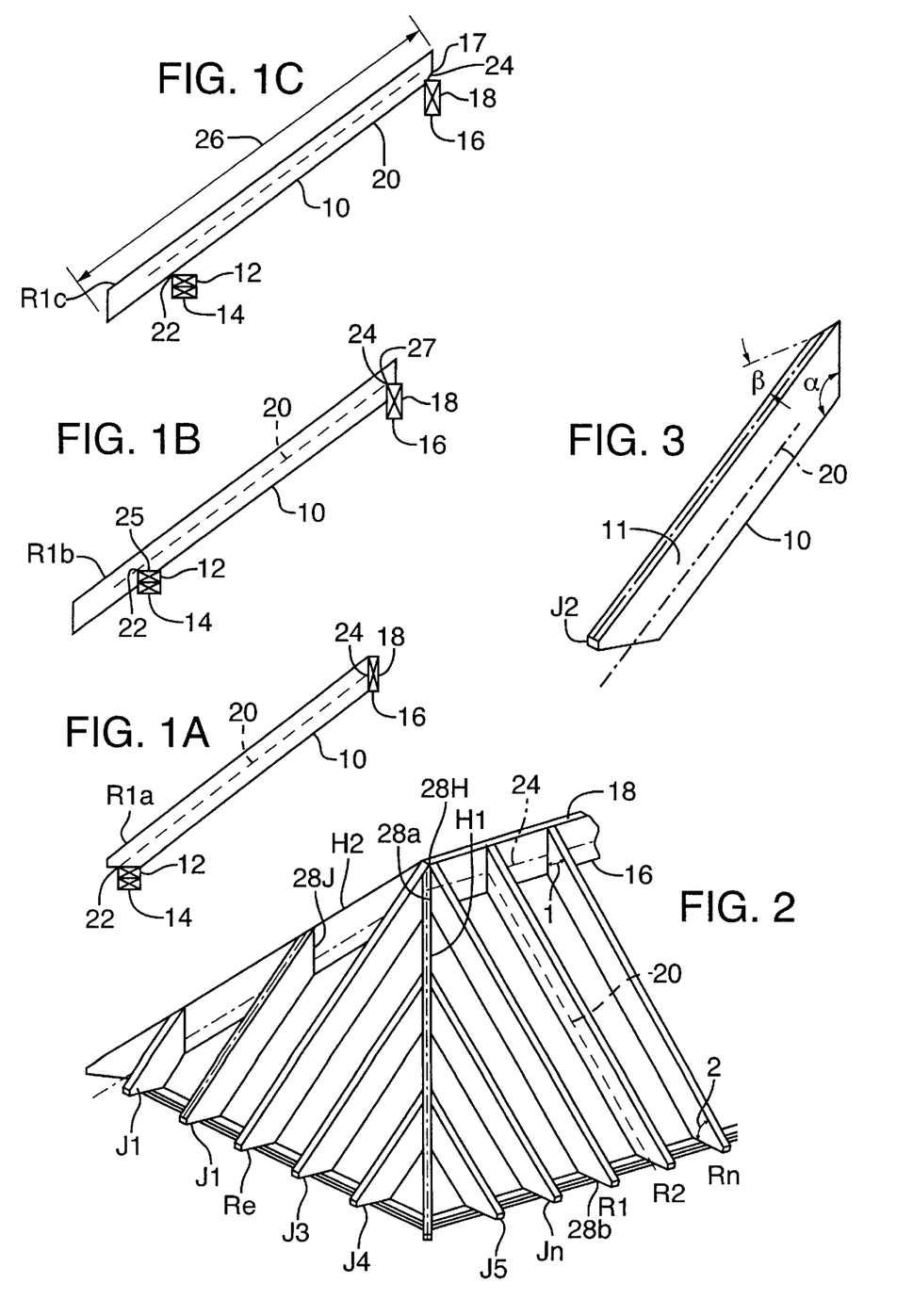
FIGS. 1A–C are profile views of regular rafters as used in three typical installations, disclosing the parameters which establish the measuring and cutting points for the operation of the present invention.
FIG. 2 is an oblique view of a hip roof and its components, including rafters, showing the important structural relationships thereof.
FIG. 3 is an oblique view of a jack rafter, with the important lines and angles indicated thereon.

FIG. 2 illustrates each of these kinds of rafters.

The present invention is also useful in cutting all of the webs and chords for a single truss in one operation. Formerly, an individual component for a number of trusses had to be made up at the same time, to reduce the amount of hand adjustment, and therefore cost, per component. Otherwise, it became very expensive to produce them for a single truss, since adjustments had to be made between the cutting of each different component.

To lay out a roof structure, certain distances must be accurately known:

1. the distance between the outside edges of the double top plate;
2. the vertical distance from the upper face of the top-plate to the ridge line; and
3. the inclined, or slant, distance between the outside edge of the double top plates and the ridge line.

It will help in understanding the following discussion to refer to FIGS. 1A–C of the drawings herein, which disclose three typical arrangements of rafters and their associated support or supported members, and will help to illustrate the concepts of "measuring line" and "ridge line":

1. FIG. 1C discloses a rafter simply laid upon the double top plate and the ridge beam, without cutting the rafter, except perhaps for a small notch at the upper end where it rests on the ridge beam:
   a. the "measuring line" runs along the lower edge of the rafter; and
   b. the "ridge line" is at the bottom of the rafter where it meets the adjoining or complementary rafter.
2. FIG. 1B discloses a rafter notched at both upper and lower ends to fit over the ridge beam and the double top plate, respectively. In this case:
   a. the "measuring line" runs parallel to the rafter's lower edge, from the outer upper edge of the double top plates to the center line of the ridge beam above its upper edge; and
   b. the "ridge line" is at the intersection of the two rafter measuring lines.
3. FIG. 1A discloses a rafter cut at both upper and lower ends to rest against the face of the ridge beam and the upper face of the double top plate, and the lower edge of the rafter intersects the lower edge of the ridge beam and the inner edge of the double top plate. In this case:
   a. the "measuring line" runs parallel to the lower edge of the rafter, from the outer upper edge of the double top plates to the point of intersection of the measuring line with the face of the ridge beam; and
   b. the "ridge line" runs down the midpoint of the ridge beam intersecting the projection of the measuring line.

The first structure of FIG. 1C is an older method of construction little used at the present time.

The second and third structures of FIGS. 1B and 1A represent methods of construction which are more widely used at present.

Regular rafters, i.e., those on which the ends are cut at right angles to the faces (or the edges), even though the ends may be cut at something other than a right angle to the edges (or the faces, respectively), do not present a great problem to manufacture, since the length of a given rafter as measured on one face (or edge) is the same as the length measured on the other face (or edge).

However, hip, valley, and jack rafters present a more difficult problem of manufacture:

1. since jack rafters have at least one end thereof cut at a composite angle, i.e., an angle both to the edges and to the faces, the lengths of opposite faces (and/or edges) thereof are unequal; and
2. hip and valley rafters have at least one end which requires two cuts, both of which are at composite angles (making a compound angle) to the faces and edges, but which are usually at right angles to each other (although not necessarily). Although the lengths on the faces (or edges) may be equal, the length on the measuring line will be different (greater) than both.

Present machinery for making cuts to produce composite or compound angles on roof structure components still requires substantial hand labor in the set-up and/or operation of cutting equipment.

U.S. Pat. No. 3,568,739 teaches the use of a gauge mounted on a table-top fence to tilt the lumber so that the saw blade remains vertical when making the compound cut. A disadvantage of this method is that the measuring line of the lumber shifts laterally across the table top and shifts vertically as the gauge length is changed for different roof slopes, causing the reference point for length measurement to change. This shifting makes the gauge method inaccurate for making precision compound or composite angle cuts using a push-feed system.

U.S. Pat. No. 4,545,274 teaches a means of tilting the axis of travel of a saw blade to correspond to the complement of the roof slope, and then angling the saw blade to make the compound cut. Lumber is moved past the cutting station in a sideways manner. A separate cutting station is required for cuts on the other end of the component and, to cut components of differing lengths, one of the cutting stations must be movable in relation to the other, which takes time. Further, the cutting process is not automatic.

There is no known machinery presently available to sequentially and automatically make the cuts necessary to achieve composite and compound angles. Further, there is no known machinery presently available to automatically make the sequential angled cuts to make all of the webs and chords for a single truss without intermittent manual adjustment of machinery during the process.

BRIEF DESCRIPTION OF THE PRESENT INVENTION

The present invention is an apparatus for making roof structure and other components from dimension lumber workpieces by making the required cuts in a sequential manner, with an operator required only to place a workpiece on an infeed table and collect the finished components at the outfeed table. Components such as hip, valley, and jack rafters, and webs and chords for trusses, are easily obtained.

As stated earlier, hereinafter "workpiece" refers to the unprocessed, or partially processed, pieces of dimension lumber, while "component" refers only to the finished piece, after all processing has been performed.

It will be helpful to refer to FIGS. 1–3, in understanding the following preliminary description.

Regular rafters, as disclosed in FIGS. 1A–C, and especially as disclosed in place in FIG. 2, although having the ends thereof cut at angles other than a right angle to the rafter edges, have a right angle between the end of the rafter and its faces, requiring only that the cutting tool be at the proper angle to the edges to make the cut.

Hip, valley, and jack rafters require that the cutting tool cut at composite angles, sometimes on the same workpiece and on the same end thereof:

1. jack rafters, as disclosed in place in FIG. 2, and especially in FIG. 3, have at least one end thereof which is cut at an angle to both the edges and the faces; this is a "composite" angle;
2. hip rafters, as disclosed in FIG. 2, have at least one end which requires two cuts, both at composite angles to the faces and edges; however, the cut faces usually are at right angles to each other, although they do not have to be; this is a "compound" angle; and
3. valley rafters (not shown in place) have the same form as hip rafters, but are needed where two sloping roofs create a valley, and present the same problems in cutting as a hip rafter.

The present invention is an apparatus for manufacturing a structural component (e.g., a rafter) which has a predetermined length along a measuring line; i.e., an imaginary line for measuring purposes extending between and beyond the outside edge of the double top plate and the ridge line of a house roof. A given rafter will be longer than the distance between these two points, as it includes, e.g., the portion of rafter creating the overhang of the roof.

The apparatus includes means for holding the workpiece during processing, tiltable infeed table for tilting the workpiece to and from the horizontal, cutting means, such as a circular saw, whose angle with respect to the workpiece is adjustable, and a means for drawing the cutting means across the workpiece. A computer controls the process, having the required data relating to lengths, angles of components, workpiece dimensions, and other information entered therein, and a program for controlling the various operations.

In the following description, the term "horizontal" is used as a noun (except for the first occurrence thereof, where it is an adjective), and refers to a hypothetical plane substantially normal to the force of gravity and parallel to the surface of the earth. Similarly, the term "longitudinal" axis is the axis of the longest dimension of the workpiece and, as used herein, refers primarily to the direction of movement of the workpiece, and the axis about which the workpiece is tipped, from face to edge or vice versa, and is distinguished from the "tilt," or first axis of the tiltable table, which has a specific location on the surface of the table with respect to the fence.

More specifically, the structure of a preferred embodiment of the apparatus of the present invention includes:
1. a table having a plane surface normally horizontal, upon which is placed a workpiece movable along its longitudinal axis. The table:
   a. includes, on the surface thereof, extending parallel to the longitudinal axis, a barrier or fence against which the workpiece is held as it is being moved and cut;
   b. is tiltable from the horizontal along a tilt axis in the surface of the table, parallel to the longitudinal axis, to obtain a first angle of workpiece orientation; and
   c. includes means for moving the workpiece lengthwise along its longitudinal axis;
2. means for cutting the workpiece, including:
   a. means for orienting the cutting means to a second angle with respect to the workpiece, by rotating it about a second or pivot axis, preferably perpendicular to the horizontal and passing through the table tilt axis; and
   b. means for moving the cutting means across and through the workpiece, thereby cutting it at a predetermined composite angle composed of the first and second angles.

Those skilled in the art will see that the foregoing structure will cut one end only of a workpiece. To obtain a second end cut at a second composite angle requires either that the workpiece be turned end-for-end, or that a second tiltable table be added, to permit a straight-through flow of workpieces. In either case, the workpiece must be tilted to a third angle by readjustment of a tiltable table, and the cutting means must be rotated to a fourth angle.

In the present invention, in addition to the tiltable table described hereinbefore, hereinafter called an "infeed" or "first" tiltable table:

3. another tiltable table, hereinafter called an "outfeed" or "second" tiltable table, having the same features as the infeed table.

The outfeed table initially must be tilted at the same angle as the infeed table in order to receive the workpiece, otherwise it may "hang up" or drop onto the outfeed table with a wrong orientation, as it moves out of the work station. After the workpiece has been moved onto the outfeed table a predetermined distance (corresponding to the required length of component), the outfeed table may be required to tilt to a third angle, and the cutting means to rotate to a fourth angle, in order to achieve the required second predetermined composite angle for cutting the second end of the workpiece.

Further preferable features for the present invention may include, on each table:

4. means for tipping the workpiece from its edge to its face, or vice versa, before the table is tilted;
5. clamp means for holding the workpiece and the finished component during processing; and
6. retractable extensions on the end of each table next to the work station, so that the workpiece is supported as it moves into and out of the work station. The extensions are retracted during cutting to avoid damage thereto or to the cutting means.

The process, from placement of the unfinished workpiece in the apparatus of the present invention to ejection of the finished component therefrom, is as follows:

1. the workpiece is placed on the horizontal surface of the first, or tiltable infeed, table, where it comes under control of the computer, and is:
   a. tipped about its longitudinal axis from its face to its edge, or vice versa, to secure the optimum orientation for the subsequent operations;
   b. tilted to a first angle to the horizontal, by tilting of the first table about a first, tilt axis parallel to, but displaced from, the longitudinal axis of the workpiece (The outfeed table is also tilted to the same first angle, at this time or during the cutting operation, but prior to the movement of the workpiece to the outfeed table); and
   c. moved lengthwise along the longitudinal axis of the workpiece into a work station, and clamped;
2. the work station includes a cutting means (e.g., a rotary saw with its rotational, or cutting, plane normal to the horizontal), which is:
   a. rotated about a second, pivot axis inclined and preferably perpendicular to the horizontal and passing through the first or tilt axis, to a second angle thereto; and
   b. drawn across the workpiece at the second angle, cutting it at a first predetermined composite angle, the resultant angle determined by the first angle and the second angle;
3. upon completion of the first cut, the cutting means is withdrawn to its initial position;
4. the workpiece is:
   a. moved lengthwise a predetermined distance along its longitudinal axis through the work station to the outfeed table, which is tilted to receive it;
   b. clamped; and
   c. tilted to a third angle to the horizontal, by tilting of the second table and also, in unison, the first table depending on the length of the workpiece, about the first or tilt axis;
5. the cutting means is:
   a. rotated about the second or pivot axis to a fourth angle; and
   b. drawn across the workpiece at a fourth angle, cutting it at a second predetermined composite angle, determined by the third angle and the fourth angle;
6. upon completion of the second cut, the cutting means is withdrawn to its initial position;
7. the workpiece is:
   a. moved a second predetermined distance lengthwise along its longitudinal axis to an ejection point; and
   b. the second table is tilted clockwise, the collapsible fence is collapsed, the clamp is released, and the workpiece is allowed to slide off the outfeed table to a receiving means.

The various steps of the process are controlled by the computer, which has been programmed according to data previously entered therein, and which measures and calculates:

1. the position and movement of the workpiece, including the starting, stopping, and distance travelled therebetween;
2. the various angles and tilts;
3. the thickness of the cutting means (e.g., saw kerf, water or steam jet, etc.);
4. after operating on these data, it sends appropriate control signals to the various means for moving, clamping, tilting, and adjusting, to obtain a component of predetermined length along its longitudinal axis between the surfaces of the ends thereof, which have simple or predetermined composite angles at one or both ends.

DETAILED DESCRIPTION OF THE PRESENT INVENTION

Certain dimensions, and the way they are determined, are critical to understanding the novel functions and operations of the present invention.

FIGS. 1A–C show typical regular rafters R1a, R1b, and R1c for convenience, spanning from double top plates 14 to ridge beam 18. Each of these arrangements is used in construction, although 1A and 1B are used more often at the present time than 1C, which is an older method of construction. A detailed examination of each will help in understanding the concepts involved in determining rafter length.

In FIG. 1A, rafter R1a rests on double top plates 14 on the outer end, and on ridge beam 18 on the inner end. Lower edge 10 intersects inner edge 12 of double top plate 14 and lower edge 16 of ridge beam 18. "Measuring line" 20 is defined as a line, parallel to lower edge 10, extending across outer edge 22 of plate 14 to its intersection with the face of ridge beam 18. Line 24 on beam 18, which is parallel to lower edge 16 thereof, and passes through the point where measuring line 20 intersects the face of beam 18, is defined as "ridge line" 24 (see FIG. 2 also).

In FIG. 1B, rafter R1b rests on plate 14 on its outer end and on ridge beam 18 on its inner end. As in FIG. 1A, measuring line 20 is defined as a line, parallel to lower edge 10 and extending across outer upper edge 22 of plate 14, to the center line of the top edge of beam 18. Ridge line 24 is the center line of edge beam 18. Notch 25 is cut into the lower edge 10 of rafter R1b so that lower edge 10 intersects inner edge 12 of double top plate 14. Notch 27 is cut into bottom edge 10 of rafter R1b at its upper end so that measuring line 20 intersects ridge line 24.

In FIG. 1C, rafter R1c rests on plate 14 on the lower end and on ridge beam 16 on the upper end. Lower edge 10 intersects outer edge 22 of plate 14 and upper edge 17 of beam 18. Measuring line 20 in this configuration is defined as a line extending along lower edge 10 of rafter R1c. Ridge line 24 is along the intersection of lower edge 10 of rafter R1c and its counterpart (not shown) on the opposite side of ridge beam 18.

FIG. 1C represents an older construction method which is seldom used at the present time.

In all three methods, the "length" 26 of R1 (see FIGS. 1 and 2), or of any other rafter, is greater than the distance between the defining points of measuring line 20 (i.e., the edge 22 of plate 14 and ridge line 24 on beam 18), as explained hereinbefore.

FIG. 2 shows a hip roof structure, with the various structural members identified to help in explaining these critical dimensions and their relation to the novel operation of the present invention.

FIG. 2 shows regular rafters R1, R2 . . . Rn placed with lower edge 10 thereof intersecting inside edge 12 of double top plate 14, which is the top of the frame structures (now shown). Lower edge 10 of rafters R1 . . . Rn intersect lower edge 16 of ridge beam 18, as shown in FIG. 1A. Measuring line 20, in this configuration, runs parallel to edge 10, from outer edge 22 of plates 14, and ridge line 24 is at the midpoint of the two faces of ridge beam 18, parallel to lower edge 16, through the point of intersection of measuring line 20 with the face of beam 18.

Length 26 of these rafters is measured along measuring line 20, and is greater than the distance between outer edge 22 and the face of beam 18. Ends 28a and 28b, are cut at angles 1 and 2, respectively, to the edges thereof at these points. The thickness of rafters R1 . . . Rn does not enter into calculations length 26 of regular rafters, since ends 28a and 28b are cut at right angles to the faces thereof.

It will be noticed that rafter Re, on the end of the hip roof, co-linear in a plan view with ridge beam 18, is a "regular" rafter since the ends thereof are cut square with the faces. Of course, if the shape of the underlying structure is something other than "square," rafter Re might not be co-linear with ridge beam 18 but at an angle thereto.

An inspection of hip rafters H1 and H2, and jack rafters J1 . . . Jn in FIG. 2 (and jack rafter J2, as shown in larger scale in FIG. 3) will disclose that at least one end thereof (the upper end) must not only be cut at an angle to the edges of the rafters, but also at an angle to the faces thereof, because they intersect hip rafters H1 and H2 at an angle. When cutting upper ends 28j of jack rafters J1 . . . Jn, or ends 28h of hip rafters H1 and H2, it is necessary to take rafter thickness into account, since calculating length 26 on one of the faces thereof will cause these rafters to be too short or too long. FIG. 3 is a somewhat larger scale illustration of jack rafter J2.

On rafters having ends with composite angles, measuring line 20 is calculated as being midway between the faces, e.g., 0.75" from each of the faces on rafters having a nominal thickness of 1.5", such as 2×4's, 2×6's, 2×8's, etc. On rafters or beams of different thicknesses, measuring line 20 would be calculated as being located one-half way from each face.

FIG. 3 discloses in greater detail the shape of jack rafter J2, with measuring line 20 indicated. It will be noted that the top end thereof is a composite angle, having an angle $\alpha$ and $\beta$ both to edge 10 and face 11 thereof, respectively, requiring not only that the workpiece from which it was cut be angled with respect to the horizontal, but that the cutting means be angled about its pivot axis at an acute angle with respect to the faces of the workpiece.

GENERAL DESCRIPTION OF THE PRESENT INVENTION

Figure 4:
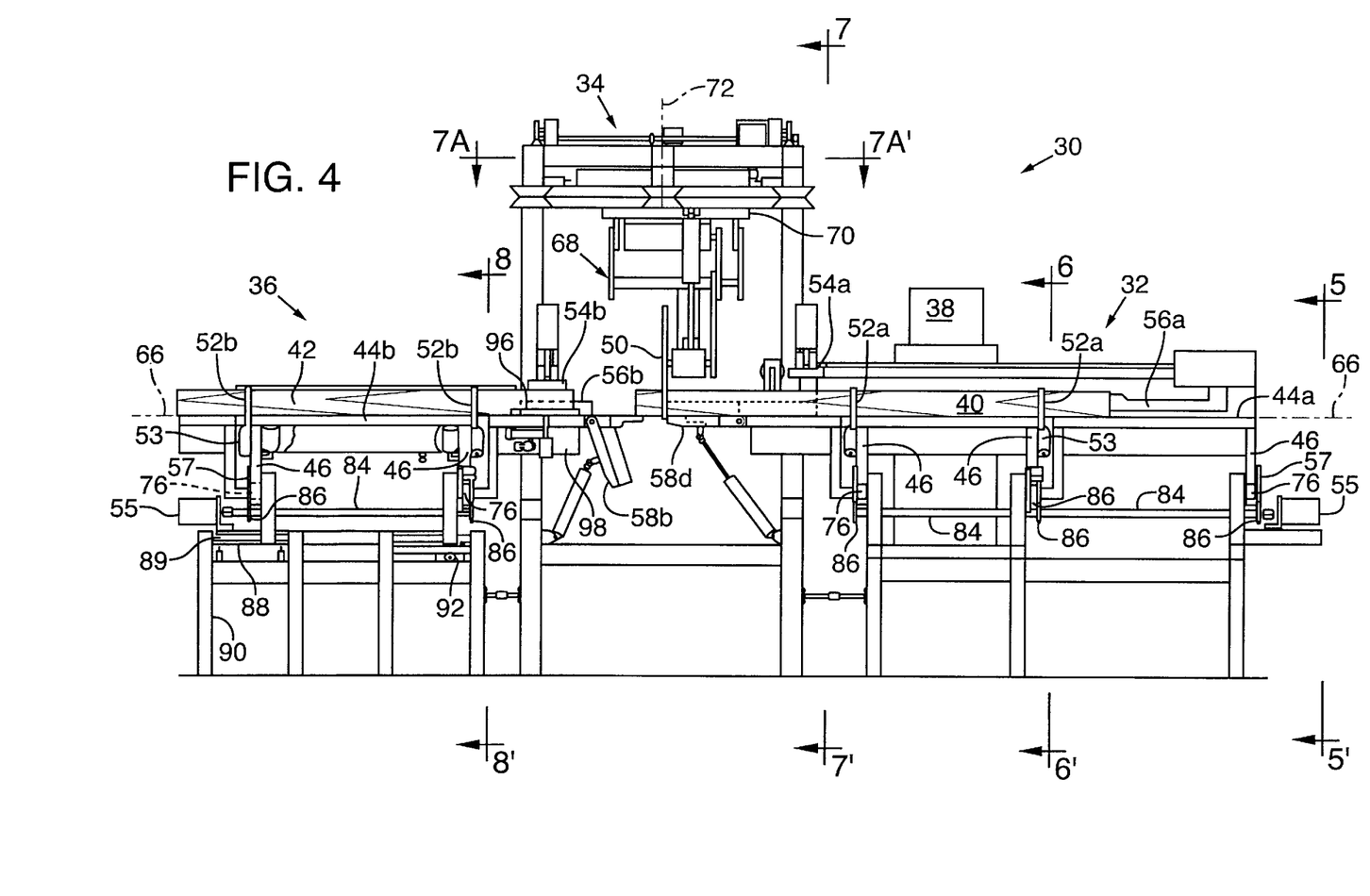
FIG. 4 is a front view of the present invention, disclosing the arrangement of the various major elements thereof.
Figure 5:
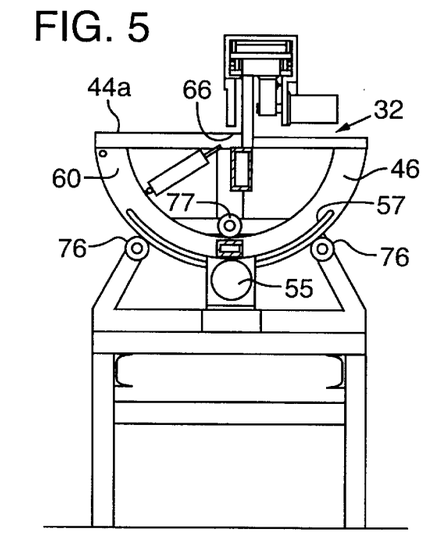
FIG. 5 discloses an end view of the present invention, from section 5–5' of FIG. 4, showing several of the individual elements, including the tiltable infeed table, of the invention and their physical relation.
Figure 6A:
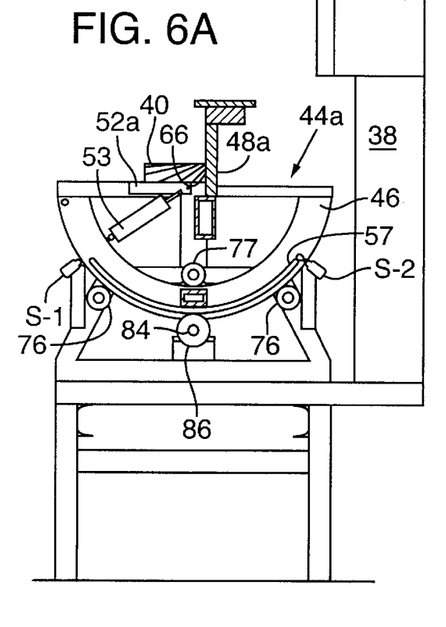
FIG. 6A discloses the present invention in cross-section at section 6–6' of FIG. 4.
Figure 6B:
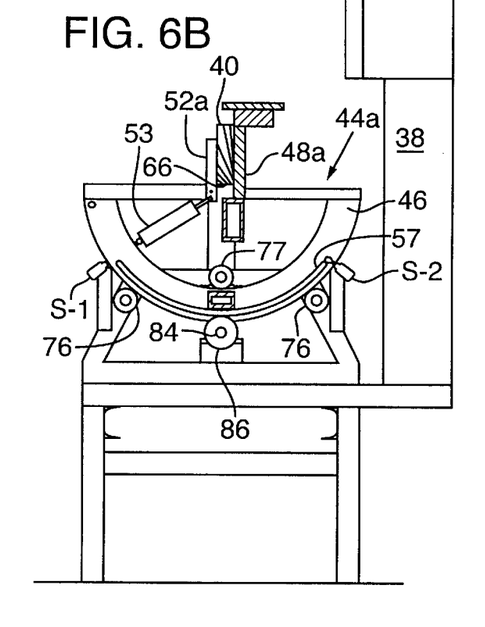
FIG. 6B discloses the present invention in cross-section at section 6–6' of FIG. 4.
Figure 6C:
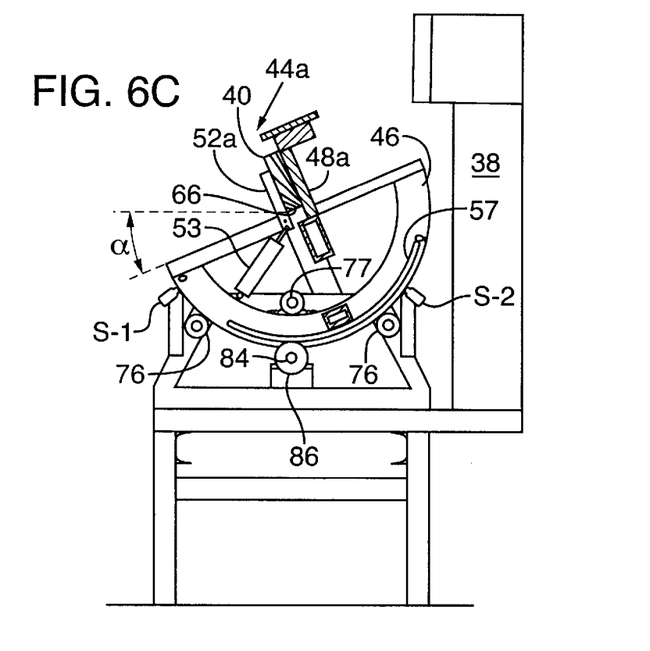
FIG. 6C discloses the present invention in cross-section at section 6–6' of FIG. 4, with the infeed table tilted counterclockwise.
Figure 7:
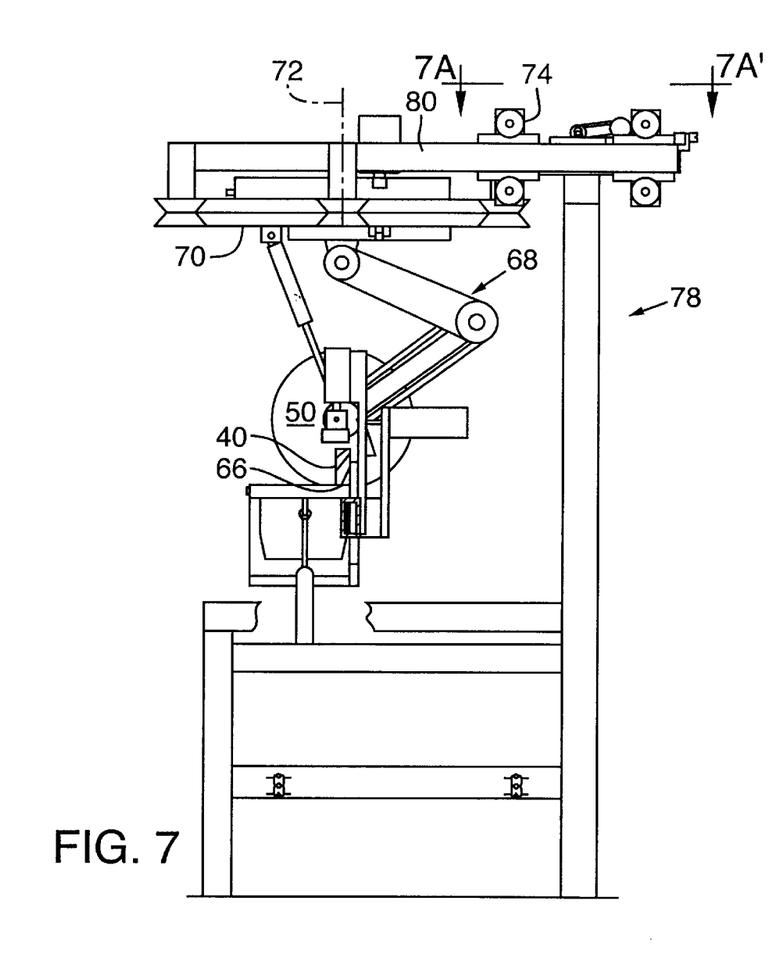
FIG. 7 discloses the present invention in cross-section at section 7–7' of FIG. 4, showing a partial view of the work station, infeed table and first retractable table and fence.
Figure 7A:
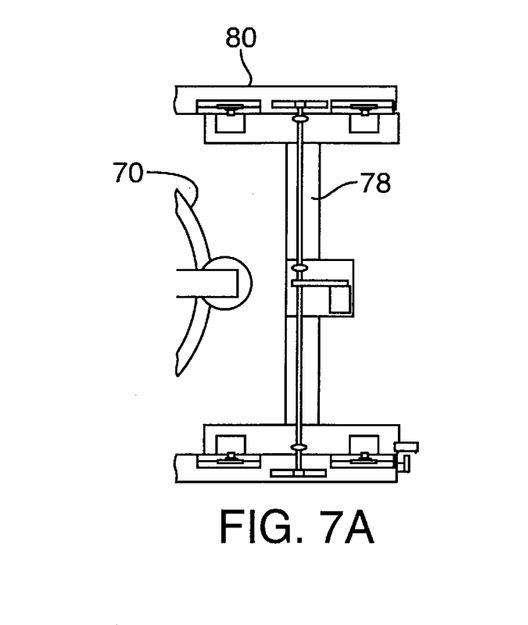
FIG. 7A is a partial top view of FIG. 7, disclosing the means of rotation thereof.
Figure 8A:
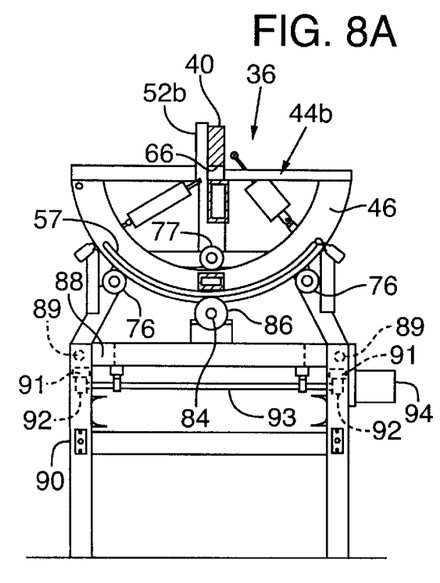
FIG. 8A discloses the present invention in cross-section at section 8–8' of FIG. 4.
Figure 8B:
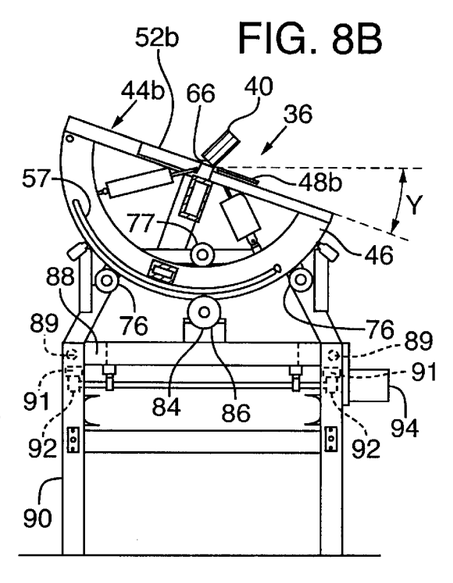
FIG. 8B discloses the present invention in cross-section at section 8–8' of FIG. 4, with the outfeed table tilted clockwise.

FIG. 4 discloses, in a view in profile, the overall structure of present invention 30. There are four basic elements of the present invention:

1. material infeed table 32, on the right-hand side of FIG. 4, and disclosed further in FIGS. 5, 6A–C and 7;
2. work station 34, to the left of center in FIG. 4, and disclosed further in FIGS. 7 and 7A;
3. material outfeed table 36, on the left-hand side of FIG. 4, and disclosed further in FIGS. 8A and 8B; and
4. computer 38, mounted on the left-hand end of infeed table 32 in FIG. 4, and shown also in FIGS. 6A–C.

In addition, infeed table 32 and outfeed table 36 each incorporate first tiltable table 44A, shown in cross-section in FIGS. 5 and 6A–C, and second tiltable table 44b, shown in FIGS. 8A and 8B, respectively. Both tables have several features in common, as briefly described hereinafter, with a more detailed description in the operational description.

GENERAL DESCRIPTION, OPERATION

Workpiece 40 enters from the right-hand end of infeed table 32 as simple dimension lumber and emerges from the left-hand end of outfeed table 36 as completed component 42, with the first and second ends thereof prepared by cutting means 50 of work station 34 according to data entered into computer 38 concerning the dimensions of a particular structure.

GENERAL DESCRIPTION OF THE MAJOR ELEMENTS

Because infeed table 32 and outfeed table 36 incorporate tiltable tables 44a and 44b, respectively, they will first be briefly described, then the four major elements identified hereinbefore will be described in the above order.

GENERAL DESCRIPTION, TILTABLE TABLES 44a and 44b

Infeed table 32 and outfeed table 36 include first and second, substantially similar, tiltable tables 44a and 44b, respectively.

Tiltable tables 44a and 44b rest and rotate on arc-shaped elements 46 (as many as are necessary to maintain planarity over the full length of tables 44a and 44b in industrial operating conditions). First tiltable table 44a incorporates first fence (or workpiece positioning reference means) 48a, and first tipping means 52a, as disclosed in FIGS. 6A–C, while second tiltable table 44b includes second fence 48b and second tipping means 52b, as disclosed in FIG. 8A. First fence 48a is fixed, while second fence 48b can fold flat onto the plane surface of table 44b, as disclosed in FIG. 8B, permitting finished component 42 to slide off table 44b into a collecting means. Both first and second tipping means 52a and 52b, respectively, act as clamps during tilting and cutting operations to hold workpiece 40 (and component 42) in place, as shown in FIGS. 6B and 6C with respect to tipping means 52a.

Tiltable tables 44a and 44b also include first means for moving 56a and second means for moving 56b, a workpiece along the tables, and first and second retractable tables 58a and 58b for bridging the gap between the two tiltable tables, all respectively, as shown in FIG. 4.

However, the second moving means 56b only serves to move the workpiece on the outfeed table beyond the fixed portion of the outfeed fence 48b and has no accuracy in positioning the workpiece relative to cutter 50. Instead, for this purpose outfeed table 44b is mounted on an outfeed carriage 88 as shown best in FIGS. 8A and 8B. Carriage 88 slides on fixed rods 89 on base frame 90. The carriage is driven by moving means comprising rack gears 91 fixed to the underside of carriage 88 and mating pinion gears 92 on a drive shaft 93 mounted in bearings on base frame 90 driven by a stepper motor 94 under the control of computer 38 (FIG. 4). Thus stepper motor 94 and its driven shaft 93 and pinions 92 serve as a means for moving the workpiece on the outfeed table to position it relative to cutter 50. These same elements, in conjunction with computer 38, serve as a means for measuring the length of movement or travel of the workpiece on the outfeed table relative to cutter 50 for correctly positioning the trailing end of the workpiece relative to cutter 50, in a manner well known to those skilled in the art.

As disclosed in FIGS. 5, 6A–C, and 8A–B, arc-members 46 rotatingly move on bearings 76 and are held in place by bearings 77 which bear upon the upper curved surface of members 46.

Tables 44a and 44b normally rest in a horizontal position, until workpiece 40 is placed thereon, when computer 38 takes over, and starts, stops, tips, tilts, measure, etc., in performing the various processes involved in changing workpiece 40 into finished component 42. Sensors S-1, S-2 cooperate with the computer to control and determine the degree of tilt, in a well-known manner.

GENERAL DESCRIPTION, MATERIAL INFEED TABLE 32

Infeed table 32 includes first tipping means 52a for tipping workpiece 40 about the longitudinal tilt or first axis 66 of table 44a as it moves lengthwise from infeed table 32 to outfeed table 36. Cutting means 50, suspended from movable carriage 68 on rotary frame 70, is mounted within workstation 34 at the downstream end of the infeed table. Rotary frame 70 rotates about a second, pivot axis 72, which is vertical, or perpendicular to the horizontal and passes through the first, tilt axis 66 on the surface of tiltable table 44a and passes along one of the surfaces of cutting means 50, preferably, the rear surface thereof. Frame 70 rotates cutting means 50 to predetermined second angle β (see FIG. 9C) to tilt axis 66, which, in conjunction with predetermined first tilt angle α (see FIG. 6C), gives the first predetermined composite angle.

Cutting means 50 is moved across workpiece 40 at second angle β, cutting it at the first predetermined composite angle, by movement of movable carriage 68 as infeed clamp 54a clamps workpiece 40 to the tiltable table 44a.

The above operations are all controlled by computer 38.

GENERAL DESCRIPTION OF MATERIAL OUTFEED TABLE 36

As described hereinbefore, outfeed table 36 includes the same features as infeed table 32, except in substantially reverse order.

First and second tiltable tables 44a, 44b tilt workpiece 40 to first predetermined angle α (FIG. 6C) under the control of computer 38 and sensors S-1, S-2 before first moving means 56a moves workpiece 40 thereon. First and second retractable tables 58a, 58b provide support for workpiece 40 during this movement. First measuring means 56a, 38, and second measuring means 91, 92, 93, 94, 38 respectively, acting cooperatively, measure the distance traveled by workpiece 40 as it moves, the total such distance being the desired length for workpiece 40 along measuring line 20. Following the movement thereof into position, second tiltable table 44b tilts to third predetermined angle γ (FIG. 8B), and cutting means 50 is rotated about pivot axis 72, as needed, to fourth predetermined angle Δ (FIG. 9D), under the control of computer 38, providing a second predetermined composite angle at which the second end of workpiece 40 will be cut. Second clamp means 54b grips workpiece 40 during tilting and cutting operations. Second retractable table 58b is retracted before workpiece 40 is cut to said predetermined length, to prevent damage to second retractable table 58b and cutting means 50 during cutting.

Outfeed table 36 includes second tipping means 52b for tipping component 42 (formerly workpiece 40) about its longitudinal axis 60 if it is needed. After the final cuts, second clamp means 54b is unclamped, ejection wheel 96 driven by motor 98 propels the finished component 42 longitudinally downstream away from the cutting station, and second tilting table 44b is tilted to an angle necessary to eject component 42 therefrom.

All of these functions are controlled by computer 38.

Figure 9A:
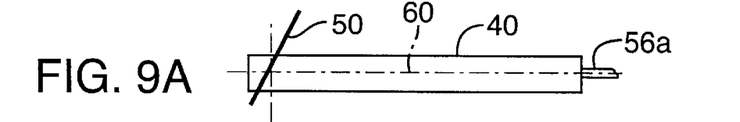
FIGS. 9A–D are representational views of four cutting positions of the cutting means with respect to a workpiece.
Figure 9B:
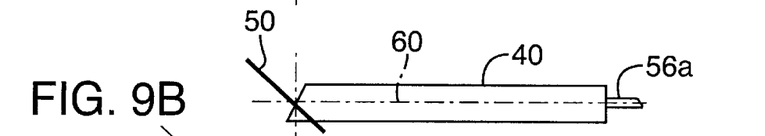
Figure 9C:
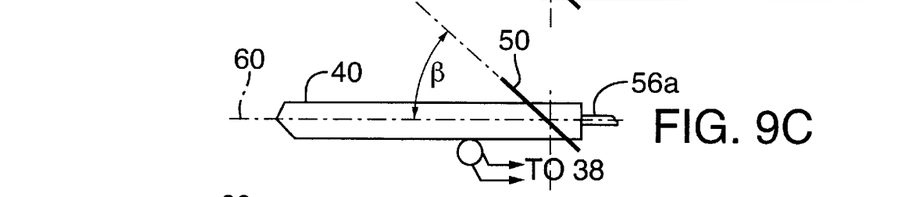
Figure 9D:
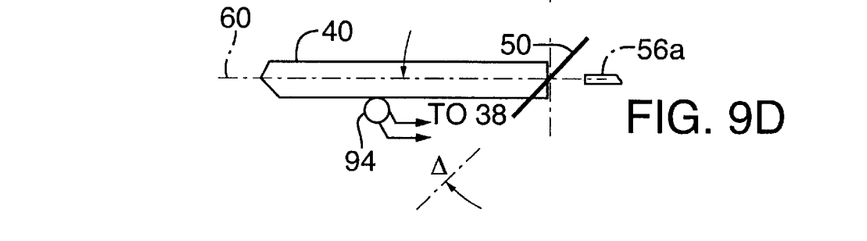

FIGS. 9A, 9B, 9C and 9D illustrate the sequence of cutting a four-angle web. All cuts shown are simple rather than compound cuts as described previously so as simply to describe the movement of a workpiece 40 through the machine from infeed to outfeed table and its positioning during cutting. Pivot axis 72 is normal to the infeed and outfeed tables, which are horizontal. The first two cuts, FIGS. 9A, 9B, are made with first moving means 56a controlled by computer 38 determining the precise cutting positions of the workpiece on infeed table 44a. Cutting of both angles at the lead end of the workpiece occurs while the infeed clamp 54a clamps the workpiece. However, after the third cut is made, FIG. 9C, first moving means 56a can no longer accurately position workpiece 40 because a portion of the trailing end of workpiece 40 has been cut off. Therefore, prior to the third cut, outfeed clamp 54b must clamp the workpiece to outfeed tilt table 44b on outfeed carriage 88. After the third cut, FIG. 9C, outfeed carriage 88 and its drive means, controlled by computer 38, position the workpiece for the fourth and final cut, FIG. 9D.

OPERATIONAL DESCRIPTION OF THE PRESENT INVENTION

The complete process, from placement of workpiece 40 on infeed table 32, to ejection of finished component 42 from outfeed table 36, is as follows:

The primary function of infeed table 32 is to receive workpiece 40, tip it, if necessary, from face to edge, or vice versa, by tipping means 52a about the longitudinal first tilt axis 66 of table 44a, and then tilt it to a first angle α by action of first tiltable table 44a about tilt axis 66, all under the control of computer 38. Workpiece 40 is then moved, by first moving means 56a, a predetermined distance into work station 34, so that its first or leading end extends beyond cutting means 50 for the one or more cuts required to be made thereon to shape such end as required.

Workpiece 40 is placed on the horizontal plane surface of first tiltable table 44a, where it comes under control of computer 38. Workpiece 40 is tipped about the longitudinal or first axis 66 of table 44a from its face to edge, or vice versa, to achieve optimum orientation for minimum elapsed time for the subsequent operations. Workpiece 40 is then tilted to first predetermined angle α to the horizontal, by tilting of first tiltable table 44a about the tilt axis 66 parallel to, but displaced from, the longitudinal axis 60 of the workpiece. Second tiltable table 44b is also tilted to first angle α, at this time or during the subsequent cutting operation, but prior to moving workpiece 40 thereto. This prevents workpiece 40 from either colliding with outfeed table 36 or dropping thereon, and avoids the danger of having workpiece 40 mal-oriented on table 36 or jamming the operation of the present invention.

DETAILED DESCRIPTION, MATERIAL INFEED TABLE 32

FIGS. 4, 6A–C, and 7 disclose the details of infeed table 32.

Infeed table 32 includes first fence 48a, which stands perpendicularly to the surface of first tiltable table 44a, and extends parallel to the longitudinal axis 60 and direction of movement of workpiece 40. Axis 66 is the axis about which first and second tiltable tables 44a, 44b, tilt, and it lies parallel to the first fence 48a and longitudinal axis 60. Tilt axis 66 lies along the surface of the first and second tiltable tables, and is spaced from longitudinal axis 60 to one-half the thickness of workpiece 40 (i.e., 0.75" in the case of a nominally 2" thick workpiece).

Table 44a has provisions for tipping workpiece 40 about axis 66, usually from face to edge, as disclosed in FIGS. 6A and 6B, but not restricted thereto. This is accomplished by tipping means such as tilt bars shown generally at 52a, 52b in FIG. 4 and one of which is shown at 52a in FIGS. 6A–6C. Bars 52a, 52b tilt workpiece 40 upward upon activation of a tilting means 53, which can be a hydraulic cylinder (as shown) a solenoid, a translation-to-rotary mechanism, or any other well-known mechanism. Further, tiltable table 44a itself, can be tilted, as disclosed in FIG. 6C, by action of table positioning means, shown here as including a motor 55 in FIG. 5, driving a shaft 84 having gears 86 thereon which, in turn, drive arc racks 57, mounted fixedly on arc members 46, which form elements of first tiltable table 44a. Arc members 46 ride on bearings 76, which are arranged so that arc members 46 are cradled between bearings 76, and held in place by bearings 77, bearing on the internal arced surface of arc members 46. There will be at least two arc members 46, and more if needed to prevent distortion of the planarity of table 44a under industrial operating conditions. Each will have an associated arc rack 57 associated therewith and will be driven by a gear 86 to avoid distortion due to torsional twisting of the shaft. Tilt table 44b has corresponding table positioning means, shown in the drawings with corresponding reference numbers.

First fence 48a preferably is fixed perpendicularly to the surface of first tiltable table 44a as it is tilted, although it could have provision for tilting with respect to first tiltable table 44a in special circumstances, if desired or needed. Tilt bars 52a, 52b associated with tiltable tables 44a, 44b also act as clamps for holding workpiece 40 in place during processing, which includes tilting of the tables. Tilt bars 52a, 52b when holding workpiece 40 against one of the fences as the associated table is tilted, allow the workpiece to be moved longitudinally on the tables. Infeed and outfeed clamps 54a, 54b, clamp the workpiece in a fixed position on the tables when necessary for cutting.

Infeed table 32 also includes first means 56a for moving workpiece 40 along the surface of infeed table 32. Moving means 56a can be a push bar operated hydraulically, a friction wheel rotating against the side of workpiece 40, or any other well-known means for incrementally moving a workpiece a measured distance, under control of computer 38.

Retractable table 58a is attached to the end of infeed table 32, and is extended to provide support for workpiece 40 when it is moved into work station 34 for cutting. Table 58a is retracted before cutting means 50 cuts workpiece 40 when the cutting angle of cutter 50 would impinge on retractable table 58a.

The actuating means for tilting table 44a, moving workpiece 40, retracting table 58a, etc., can be any of a number of actuators generally available. They can be controlled and sensed by appropriate sensors attached thereto, sending signals to computer 38, and receiving control signals therefrom as necessary to perform needed operations.

DETAILED DESCRIPTION, WORK STATION 34

The primary function of work station 34 is to convert workpiece 40 from a piece of dimension lumber into finished component 42, with the ends being cut to fit between two or more other components which may be at something other than simple angles to one another, as shown in FIGS. 2 and 3. Two or more cuts may be needed for a particular component to fit into a specific location. For example, a standard rafter may need only two cuts, each at a simple angle to the edges of the rafter and, consequently, at a simple angle to each other (normally 90 degrees), as shown in FIGS. 2 and 3.

However, FIG. 2 also shows a jack rafter which, while needing only two cuts, requires one to be at a composite angle, that is, at an angle to the edges of the rafter as well as to the face thereof.

As seen in FIGS. 4, 7, and 7A, work station 34 includes cutting means 50 or cutting element 50 (here a rotary saw blade), suspended from upper framework 78 of base 90 via rotary frame 70 and movable carriage 68 which permits cutting means 50 to be rotated about pivot axis 72 which, extended downward, will pass through tilt axis 66, about which both infeed tiltable table 44a and outfeed tiltable table 44b tilt. Pivot axis 72 passes along one edge or surface of cutting means 50, which is the reference edge for calculation purposes by computer 38.

Pivot axis 72 is preferably perpendicular to the horizontal, although it does not have to be, and the intent of the present invention would not be avoided by having cutting means 50 rotate about an inclined pivot axis. Such a situation could easily be compensated for by adjusting the tilt of table 44a and the angle of rotation of cutting means 50.

Upper framework 78 includes a traveling framework 80 which suspends rotary frame 70. By means of rotary frame 70, comprising a cutter positioning means, cutting means 50 can be rotated to any angle with respect to tilt axis 66, required to obtain a first predetermined composite angle on the first end of workpiece 40. Rotary frame 70 rotates with respect to traveling frame 80, and carriage 68 permits cutting means 50 to be drawn across workpiece 40 at a desired angle.

Figure 10A:
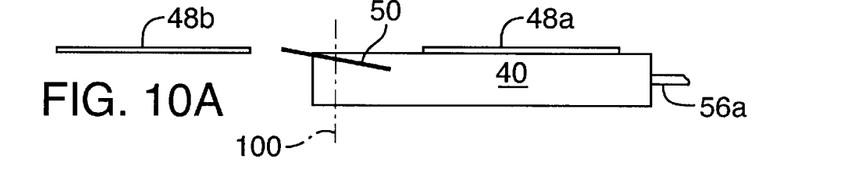
FIGS. 10A–C are representational views of a cutting means (e.g., a small diameter saw) when making a long angled cut across a workpiece, showing the pivot axis thereof.
Figure 10B:
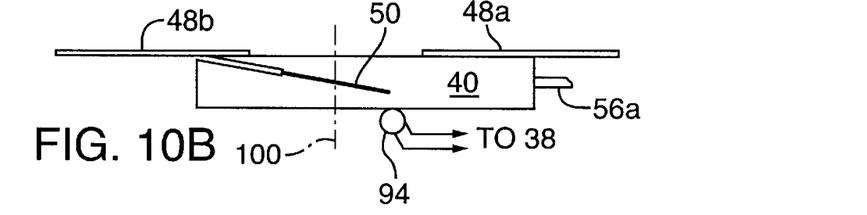
Figure 10C:
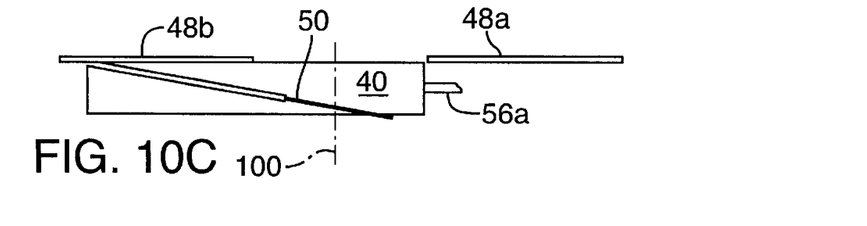

This arrangement also permits angled cuts to be made by the combined coordinated movements of workpiece 40 and carriage 80 for cutting means 50, as disclosed in FIGS. 10A–10C. If saw 50 is rotated to a given angle to the direction of movement of workpiece 40, and workpiece 40 is pushed longitudinally through saw 50 while carriage 80 is not constrained, the saw 50 will move laterally along the linear path 100 of saw carriage 80 as saw 50 cuts at its preset angle (FIGS. 10A–10C. In this manner, cutting means 50 can make long cuts of the workpiece at small cutting angles β.

Cutting means 50 can be moved across workpiece 40 in any of several ways. As shown in FIG. 7, it can be suspended from a hydraulically controlled carriage mechanism 68 which permits it to move down and across workpiece 40. Or, it could ride on a traveling carriage (not shown) which moves on a track suspended transversely across the longitudinal axis of movement of workpiece 40. The traveling carriage could be rotatable on framework 70, and translatable on framework 80.

DETAILED DESCRIPTION, MATERIAL OUTFEED TABLE 36

Outfeed table 36 incorporates many of the same features of infeed table 32, so that it will not be necessary to describe these in detail, except as necessary for a complete understanding of the present invention.

Outfeed table 36 includes collapsible fence 48b (FIGS. 8A & 8B) which preferably stands perpendicular to the surface of second tiltable table 44b, and parallel to longitudinal and tilt axes 60 and 66, the direction of movement of workpiece 40. Outfeed table 36 also includes second tipping means 52b similar to first tipping means 52a, although it is used primarily for clamping workpiece 40 against collapsible fence 48b during tilting and cutting operations.

If it is necessary, when workpiece 40 is moved from work station 34, second tiltable table 44b, a part of outfeed table 36, may be tilted to second angle β to avoid workpiece 40 from "hanging up." After workpiece 40 is on second tiltable table 44b, it will be clamped in place by tilt bar 52b against collapsible fence 48b, and tiltable table will be tilted to fourth angle γ about its tilt axis 66. Cutting means 50 will be rotated to fifth angle Δ, (FIG. 9D), which is the angle required, with fourth angle γ, to cut the second predetermined simple angle on the second end of workpiece 40.

After the second predetermined composite angle is obtained, tilt bar 52b is deactivated as a clamp, component 42 is moved along its longitudinal axis 60 until it clears work station 34, collapsible fence 48b is collapsed, and table 44b is tilted, if necessary, to permit component 42 to slide off into a collecting bin (not shown), as seen in FIGS. 8A and 8B, respectively.

It will be understood by those skilled in the art that, although the foregoing description describes only a single cut on an end of a workpiece, the same processes, functions, and operations hold whether the cuts are at simple or composite angles, and whether performed on the first end or the second end of workpiece 40, and whether more than one cut must be made to obtain a desired component, such as a hip or valley rafter, as shown in FIGS. 9A–9D.

All of these functions and operations are under the control of computer 38, which among other functions, serves in conjunction with the sensors and activators associated with the various powered components, as measuring means for determining the various angles at which the tilt tables 44a, 44b and cutter 50 are set to perform their functions.

All of the elements described herein contain activators and sensors (not shown) to receive and feed information to computer 38. These are well known to those skilled in the art, and need not be described further.

The terms and expressions which have been employed in the foregoing specification are used therein as terms of description and not of limitation, and there is no intention, in the use of such terms and expressions, of excluding equivalents of the features shown and described, or portions thereof, it being recognized that the scope of the invention is defined and limited only by the claims which follow.

I claim:

1. An adjustable apparatus for cutting a workpiece, the apparatus comprising:
   a base;
   a table having flat support surface for supporting the workpiece, the table being pivotally connected to the base for pivoting to various angular positions about a tilt axis residing substantially at and extending along the table support surface; and
   a cutter having a cutting element defining a cutting plane, the cutter being pivotally connected to the base for pivoting to various angular positions about a cutter pivot axis residing in the cutting plane, the cutter pivot axis intersecting the table tilt axis and being angularly disposed thereto such that the cutting plane intersects the plane of the table support surface and is selectively angularly positionable relative to the table tilt axis,
   the cutting element movable within the cutting plane toward the plane of the table support surface such that the cutting element approaches and cuts an exposed portion of the workpiece resting on the support surface, with the various angular positions of the table and the various angular positions of the cutter determining a composite angle at which the workpiece is cut.

2. The apparatus of claim 1 including a table positioning means for pivoting the table to a selected one of its said various angular positions about the table tilt axis and a cutter positioning means for pivoting the cutter to a selected one of its said various angular positions about the cutter pivot axis such that said workpiece can be cut at a preset composite angle.

3. The apparatus of claim 2 wherein the cutter positioning means comprises a rotatable framework pivotable about the pivot axis, and the cutter is connected to the rotatable framework for movement of the cutting element within the cutting plane and is operable to cut the workpiece in the cutting plane.

4. The apparatus of claim 3 wherein the cutter is connected to the rotatable framework for the movement of the cutting element in the cutting plane.

5. The apparatus of claim 3 wherein the cutter is connected to the rotatable framework for the downward movement of the cutting element toward the plane defined by the support surface.

6. The apparatus of claim 3 wherein the rotatable framework includes a carriage connecting the cutter to the rotatable framework for movement within a range of vertical and horizontal positions within the cutter plane, such that the cutting element is not constrained to linear motion.

7. The apparatus of claim 1 wherein the cutter pivot axis is vertically oriented.

8. The apparatus of claim 1 wherein the cutting element comprises a circular saw blade rotating about a blade axis perpendicular to the cutter plane.

9. The apparatus of claim 1 wherein the table tilt axis is horizontally oriented.

10. The apparatus of claim 1 including a guide fence connected to the table and having a guide surface perpendicular to the table surface, and against which the workpiece may rest.

11. The apparatus of claim 1 including a guide fence connected to the table and having a guide surface parallel to the table tilt axis, and against which the workpiece may rest.

12. The apparatus of claim 1 wherein said table is a first table, and further including a second table pivotally connected to the base for pivoting about the table tilt axis.

13. The apparatus of claim 12 wherein the cutter pivot axis is vertical and the table tilt axis is horizontal.

14. The apparatus of claim 12 wherein the first table and the second table are longitudinally adjacent to one another and include longitudinally adjacent end portions in a region of the cutter, said apparatus including means for retracting said end portions to avoid interference with the cutting element during cutting movement of the cutting element in the cutting plane to cut the workpiece.

15. The apparatus of claim 12 wherein the first table and second table each include a guide fence for guiding the workpiece in its longitudinal movement on the tables, each guide fence having a guide surface parallel to the table tilt axis.

16. The apparatus of claim 15 wherein the guide fence for the second table is collapsible from an upright guiding position to a retracted inoperative position.

17. The apparatus of claim 15 wherein each table includes a retractable table end portion in a region of the cutter, and wherein the apparatus further includes tipping means associated with at least one of the tables and movable from a first position relative to the guide fence of the one table to a second position relative to the same guide fence for tipping a workpiece of rectangular cross-section from edge surface abutment with the guide fence to face surface abutment with the guide fence.

18. The apparatus of claim 1 wherein the table includes tipping means for repositioning the workpiece relative to the table support surface.

19. The apparatus of claim 18 wherein a fence is disposed on the table, and the tipping means further is for clamping the workpiece against the fence for securing the workpiece in a fixed position relative to the table support surface.

20. The apparatus of claim 1 including table measuring means for determining a first angle amount by which the first table is offset from horizontal.

21. The apparatus of claim 1 including a cutter measuring means for determining the angular position of the cutter relative to the table tilt axis.

22. The apparatus of claim 1 wherein the cutter pivot axis is vertical and the table tilt axis is horizontal.

23. A method of cutting an elongate workpiece having a longitudinal axis and a first and a second end by employing an apparatus having a first table with a tilt axis extending along and lying at a work support surface of the table, and a cutter having a cutting element, the cutting element defining a cutting plane and being movable within a cutting region, the method comprising the steps:

positioning the workpiece on the work support surface of the table in a first position with the first end in the cutting region and the longitudinal axis of the workpiece parallel to the tilt axis;

tilting the first table about the tilt axis to rotate the workpiece about the tilt axis to a selected first orientation;

pivoting the cutter about a pivot axis, the pivoting axis extending through the plane of the table support surface, to a selected first cutter orientation; and after performing the above steps, moving the cutting element within the cutting plane in a direction generally orthogonal to at least a portion of the cutting element and toward the workpiece and making a first cut in the workpiece;

after making the first cut, tilting the table about the tilt axis to rotate the workpiece to a selected second orientation;

pivoting the cutter about said pivot axis to a selected second cutter orientation;

positioning the workpiece on the work support surface in a second position on the table with the first end in the cutting region and the longitudinal axis parallel to the tilt axis;

after performing the above steps, moving the cutting element within the cutting plane in a direction generally orthogonal to at least a portion of the cutting element and toward the workpiece and making a second cut in the workpiece at the first end to cut the first end at a compound angle.

24. A method of cutting a workpiece having a first and a second end by employing an apparatus having a first table, a second table, and a cutter defining a cutting plane and movable within a cutting region, the method comprising the steps:

positioning the workpiece on the first table in a first position with the first end in the cutting region;

pivoting the first table to rotate the workpiece to a selected first orientation;

positioning the cutter in a selected first cutter orientation; and after performing the above steps, moving the cutter within the cutting plane toward the workpiece and making a first cut in the workpiece;

after making the first cut, advancing at least a portion of the workpiece onto the second table;

pivoting the second table to rotate the workpiece to a selected second orientation;

positioning the cutter in a selected second cutter orientation;

after performing the above steps, moving the cutter within the cutter plane toward the workpiece and making a second cut in the workpiece.

25. A method of cutting a workpiece having a first and a second end by employing an apparatus having a first table and a cutter having a cutting element, the cutting element defining a cutting plane and being movable within a cutting region, the method comprising the steps:

positioning the workpiece on the table in a first position with the first end in the cutting region;

pivoting the table to rotate the workpiece to a selected first orientation;

positioning the cutter in a selected first cutter orientation;

after performing the above steps, moving the cutting element within the cutting plane in a direction generally orthogonal to at least a portion of the cutting element and toward the workpiece and making a first cut in the workpiece;

after making the first cut, pivoting the table to rotate the workpiece to a selected second orientation;

positioning the cutter in a selected second cutter orientation;

positioning the workpiece in a second position on the table with the first end in the cutting region;

after performing the above steps, moving the cutting element within the cutting plane in a direction generally orthogonal to at least a portion of the cutting element and toward the workpiece and making a second cut in the workpiece;

after making the first and second cuts, advancing at least a portion of the workpiece onto a second table adjacent to the first table;

pivoting the second table to rotate the workpiece to a selected third orientation;

positioning the cutter in a selected third cutter orientation;

after performing the above steps, moving the cutting element within the cutting plane in a direction generally orthogonal to at least a portion of the cutting element and toward the workpiece and making a third cut in the workpiece.

26. The method of claim 25 comprising the steps:

after making the first, second, and third cuts, pivoting the second table to rotate the workpiece to a selected fourth orientation:

positioning the cutter in a selected fourth cutter orientation;

after performing the above steps, moving the cutting element within the cutting plane in a direction generally orthogonal to at least a portion of the cutting element and toward the workpiece and making a fourth cut in the workpiece.

27. A method of cutting a workpiece comprising the steps:

supporting the workpiece having a longitudinal axis on a tiltable planar work support surface having a tilt axis lying in and extending along the plane of the surface, and positioning the workpiece with the longitudinal axis of the workpiece parallel to the tilt axis of the support surface;

positioning a cutter in a cutting plane that intersects the plane of the support surface, the cutter having a cutting element that lies in the cutting plane;

pivoting the cutter about a pivot axis, the pivoting axis lying in the cutting plane and that intersecting the tilt axis, to a first angular position relative to the tilt axis;

tilting the support surface and supported workpiece about the tilt axis to a second angular position relative to a reference position of the support surface; and moving the cutting element in the cutting plane in a direction generally orthogonal to at least a portion of the cutting element and toward the plane of the support surface and through the workpiece while maintaining the cutter in the first angular position and the support surface in the second angular position to cut the workpiece at a composite angle.

\* \* \* \* \*